(12) United States Patent
Li

(10) Patent No.: US 10,832,619 B2
(45) Date of Patent: Nov. 10, 2020

(54) METHOD FOR CONTROLLING SCREEN DISPLAY AND DEVICE USING THE SAME

(71) Applicant: BEIJING XIAOMI MOBILE SOFTWARE CO., LTD., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/208,118

(22) Filed: Dec. 3, 2018

(65) Prior Publication Data

US 2019/0172403 A1 Jun. 6, 2019

(30) Foreign Application Priority Data

Dec. 5, 2017 (CN) .......................... 2017 1 1265201

(51) Int. Cl.
*G09G 3/34* (2006.01)
*H04W 52/02* (2009.01)

(52) U.S. Cl.
CPC ........ *G09G 3/3406* (2013.01); *H04W 52/027* (2013.01); *G09G 2320/0285* (2013.01); *G09G 2320/062* (2013.01); *G09G 2320/066* (2013.01); *G09G 2320/0626* (2013.01); *G09G 2320/0633* (2013.01); *G09G 2320/0646* (2013.01);
(Continued)

(58) Field of Classification Search
CPC ......... G09G 3/3406; G09G 2320/0285; G09G 2320/062; G09G 2320/0626; G09G 2320/0633; G09G 2320/0646; G09G 2320/066; G09G 2330/021; G09G 2360/144; G09G 2360/145; G09G 2370/022; H04W 52/027; Y02D 70/00
See application file for complete search history.

(56) References Cited

U.S. PATENT DOCUMENTS 7,185,283 B1 2/2007 Takahashi
2007/0273714 A1 11/2007 Hodge et al.
(Continued)

FOREIGN PATENT DOCUMENTS

CN 101951445 A 1/2011
CN 103051777 A 4/2013
(Continued)

OTHER PUBLICATIONS

The First Office Action to Russian Patent Application No. 2018141775/08(069526) dated Jul. 18, 2019 including English translation, (14p).
(Continued)

*Primary Examiner* — Robert J Michaud
(74) *Attorney, Agent, or Firm* — Arch & Lake LLP

(57) ABSTRACT

A method for controlling screen display and a device using the method are provided in the field of computer technology. The method includes: during the using of a target application, when displaying a target interface is detected, determining a brightness adjustment parameter corresponding to the target interface according to a pre-stored corresponding relationship between the interface of the application and the brightness adjustment parameter; and reducing a current backlight brightness based on the brightness adjustment parameter corresponding to the target interface.

20 Claims, 6 Drawing Sheets

(52) U.S. Cl.
CPC . *G09G 2330/021* (2013.01); *G09G 2360/144* (2013.01); *G09G 2360/145* (2013.01); *G09G 2370/022* (2013.01); *Y02D 30/70* (2020.08)

(56) References Cited

U.S. PATENT DOCUMENTS

| | | | |
|---|---|---|---|
| 2011/0069089 A1 | 3/2011 | Kopf | |
| 2014/0168236 A1* | 6/2014 | Keefe | G09G 3/3406 345/520 |
| 2017/0110069 A1* | 4/2017 | Shoshan | G09G 5/026 |

FOREIGN PATENT DOCUMENTS

| | | |
|---|---|---|
| CN | 103313002 A | 9/2013 |
| CN | 104616636 A | 5/2015 |
| CN | 104618588 A | 5/2015 |
| CN | 105187626 A | 12/2015 |
| CN | 105450870 A | 3/2016 |
| CN | 105575360 A | 5/2016 |
| CN | 105988677 A | 10/2016 |
| CN | 106534494 A | 3/2017 |
| CN | 106604378 A | 4/2017 |
| CN | 106710535 A | 5/2017 |
| EP | 1107221 A2 | 6/2001 |
| EP | 1892698 A1 | 2/2008 |
| EP | 2521119 A2 | 11/2012 |
| JP | 2001154642 A | 6/2001 |
| JP | 2005043894 A | 2/2005 |
| JP | 2005049631 A | 2/2005 |
| JP | 2006030392 A | 2/2006 |
| JP | 2007011304 A | 1/2007 |
| JP | 2009069835 A | 4/2009 |
| JP | 2017526944 A | 9/2017 |
| RU | 2524354 C2 | 7/2014 |
| WO | 2008117784 A1 | 10/2008 |
| WO | 2016/160382 A1 | 10/2016 |

OTHER PUBLICATIONS

International Search Report (English translation) issued in corresponding International Application No. PCT/CN2018/082534, dated Sep. 4, 2018, (6p).
International Search Report issued in corresponding PCT/CN2018/082534, dated Sep. 4, 2018, 4 pages.
Extended European Search Report dated May 21, 2019 corresponding to EP Application No. 18210126.1 (9p).
First Office Action dated May 31, 2019 corresponding to Chinese Application No. 201711265201.4 and English translation (12p).
Book article Display Technology (2011 Edition), Chapter 2.5.1 "Brightness, contrast and grayscale" and English translation; Electronic Information Specialty—http://www.xduph.com, (13p).
Second Office Action issued to Chinese Patent Application No. 201711265201.4 dated Dec. 31, 2019 and English translation, (14p).
First Office Action issued to Japanese Application No. 2018-530139 dated Mar. 10, 2020 with English translation, (14p).
Second Office Action issued to Japanese Application No. 2018-530139 dated Aug. 11, 2020 with English translation, (6p).

* cited by examiner

METHOD FOR CONTROLLING SCREEN DISPLAY AND DEVICE USING THE SAME

CROSS-REFERENCE TO RELATED APPLICATIONS

This application is based on and claims priority to Chinese patent application No. 201711265201.4 filed on Dec. 5, 2017, the entire content of which is hereby incorporated by reference for all purposes.

TECHNICAL FIELD

The present disclosure relates to the field of computer technology, and more particularly to a method for controlling screen display and a device using the method.

BACKGROUND

With the development of computer technology, mobile terminals such as mobile phones have become necessities for modern people and play an increasingly important role in daily lives of people.

As mobile phone screens become larger and larger, mobile phone screens become the main power consumption of mobile phones, so there is an urgent need for a way to reduce the power consumption of mobile phone screens.

SUMMARY

In order to overcome at least a part of the problem in the related art, the present disclosure provides a method for controlling screen display and a device using the method. The technical solution is as follows.

According to a first aspect of the present disclosure, A method for controlling screen display is provided, including: during the using of a target application, when displaying a target interface is detected, determining a brightness adjustment parameter corresponding to the target interface according to a pre-stored corresponding relationship between the interface of the application and the brightness adjustment parameter; and reducing a current backlight brightness based on the brightness adjustment parameter corresponding to the target interface.

In this way, a more accurate brightness adjustment parameter may be acquired.

In this way, a more accurate brightness adjustment parameter may be acquired.

In this way, the stored corresponding relationship may be updated timely.

According to a second aspect of the present disclosure, a device for controlling screen display is provided, wherein the device includes: a processor; and a memory for storing instructions executable by the processor. The processor is configured to: during using of a target application, when displaying a target interface is detected, determine a brightness adjustment parameter corresponding to the target interface according to a pre-stored corresponding relationship between the interface of the application and the brightness adjustment parameter; and reduce a current backlight brightness based on the brightness adjustment parameter corresponding to the target interface.

According to a third aspect of the present disclosure, a computer readable storage medium is provided, wherein the storage medium has stored therein instructions that, when executed by one or more processors of a terminal for controlling screen display, causes the terminal to perform acts including: during using of a target application, when displaying a target interface is detected, determining a brightness adjustment parameter corresponding to the target interface according to a pre-stored corresponding relationship between the interface of the application and the brightness adjustment parameter; and reducing a current backlight brightness based on the brightness adjustment parameter corresponding to the target interface.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure. In the drawings.

Throughout the above drawings, definite embodiments of the present disclosure have been shown, which will be described in more detail hereinafter. These drawings and textual description are not intended to limit the conception scope of the present disclosure by any manner, but rather to teach those skilled in the art the concepts of the present disclosure by reference to specific embodiments.

DETAILED DESCRIPTION

Reference will now be made in detail to examples, examples of which are illustrated in the accompanying drawings. The following description refers to the accompanying drawings in which the same numbers in different drawings represent the same or similar elements unless otherwise represented. The implementations set forth in the following description of examples do not represent all implementations consistent with the present disclosure. Instead, they are merely examples of devices and methods consistent with aspects related to the present disclosure as recited in the appended claims.

Embodiments of the present disclosure provide a method for controlling screen display, and an execution body of the method may be a terminal. The terminal may be a mobile terminal used by a user, such as a mobile phone, etc., and the terminal may be provided with a processor, a memory, a transceiver, or the like. The processor may be used for processing a process for controlling screen display. The memory may be used for storing data required for the screen display control process and generated data. The transceiver may be used to receive and transmit data. The terminal can further be provided with an input and output device such as a screen, a light sensor, or the like. The screen may be used to display an interface of the application, and the light sensor may be used to detect an ambient light intensity. In this embodiment, the terminal being a mobile phone is as an example to describe a telephone solution in detail. Other cases are similar to these descriptions, which will not be repeated again.

Figure 1:
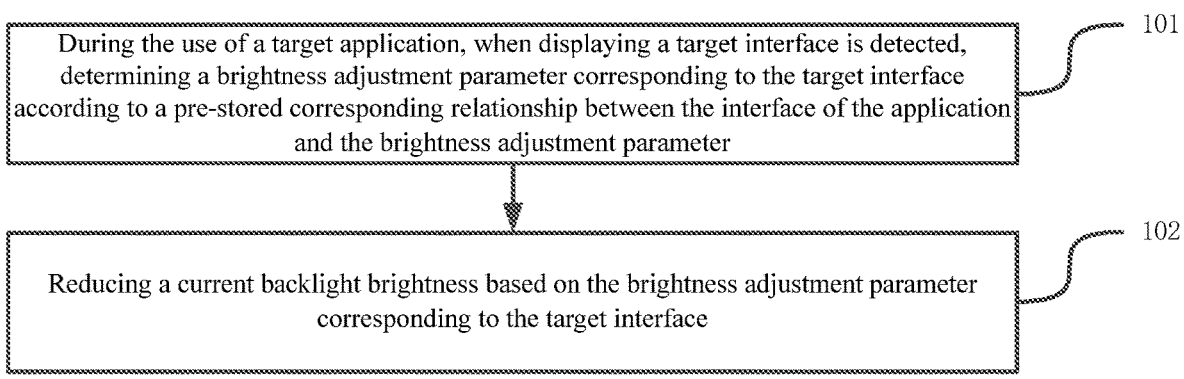
FIG. 1 is a flowchart of a method for controlling screen display according to an example.

As shown in FIG. 1, the processing flow of the method may include the following steps.

In step 101, during the using of a target application, when displaying a target interface is detected, a brightness adjustment parameter corresponding to the target interface is determined according to a pre-stored corresponding relationship between the interface of the application and the brightness adjustment parameter.

In the embodiment, the target application may be any application installed in the terminal, such as a social application, a shopping application, etc., and the target interface may be any interface in the target application.

In the implementation, after the terminal detects that the target application is started up and when a display instruction of the target interface is detected, the terminal may acquire the pre-stored corresponding relationship between the interface of the application and the brightness adjustment parameter. In the corresponding relationship, the brightness adjustment parameter corresponding to the interface of the application is recorded. It may be a case where some interfaces of an application correspond to a brightness adjustment parameter, or different interfaces of an application correspond to different brightness adjustment parameters. The terminal may find the brightness adjustment parameter corresponding to the target interface from the corresponding relationship. For example, the target interface is a chat interface of a certain social application. The user opens the social application and wants to chat with a friend, he may operate to open a chat interface with an account of the friend, and then the terminal will detect a display command of the chat interface, and then determine the brightness adjustment parameter corresponding to the chat interface.

Optionally, the corresponding relationship between the interface of the application and the brightness adjustment parameter may be stored in a list, as shown in Table 1. Here, different applications may have different user interfaces and each user interface may be respectively adjusted with different brightness adjustment parameters. Each of these brightness adjustment parameters may be set/obtained individually.

TABLE 1

| application | interface | brightness adjustment parameter |
|---|---|---|
| social application 1 | chat interface | brightness adjustment parameter 1 |
| | main interface | brightness adjustment parameter 2 |
| | ... | ... |
| shopping application 1 | product browsing interface | brightness adjustment parameter 3 |
| | account information interface | brightness adjustment parameter 4 |
| | ... | ... |

Optionally, the backlight brightness is adjusted only when the ambient light brightness is within a certain range, and the corresponding step 101 can be processed as follows.

When displaying the target interface is detected, a current ambient light brightness is acquired, and if it is determined that the current ambient light brightness is within a preset brightness range, a brightness adjustment parameter corresponding to the target interface is determined according to a pre-stored corresponding relationship between an interface of an application and the brightness adjustment parameter.

The preset brightness range can be preset by a technician and stored in the terminal, such as 50 lux to 500 lux.

In the implementation, when displaying the target interface is detected, the terminal may use the light sensor to detect the ambient light brightness, and then determine whether the detected ambient light brightness is within a preset brightness range. If the ambient light brightness is within the preset brightness range, the terminal may acquire the pre-stored corresponding relationship between an interface of an application and the brightness adjustment parameter. In the corresponding relationship, the brightness adjustment parameter corresponding to the interface of the application is recorded. It may be a case where some interfaces of an application correspond to a brightness adjustment parameter, or different interfaces of an application correspond to different brightness adjustment parameters. The terminal may find the brightness adjustment parameter corresponding to the target interface from the corresponding relationship.

In this way, with regard to interfaces, of which the user can clearly see the displaying since the backlight brightness is relatively high when the ambient light is relatively strong, the backlight brightness of them is adjusted only when the ambient light brightness is not particularly high. In this way, not only the user can clearly see the displayed interface, but also the power consumption of the screen can be reduced.

Optionally, the backlight brightness is adjusted only when the current backlight brightness is relatively large, and the corresponding step 101 may be processed as follows.

When displaying the target interface is detected, a current backlight brightness is acquired, and if it is determined that the current backlight brightness is greater than a preset value, a brightness adjustment parameter corresponding to the target interface is determined according to a pre-stored corresponding relationship between an interface of an application and the brightness adjustment parameter.

The preset value can be preset by a technician and stored in the terminal.

In the implementation, when displaying the target interface is detected, the terminal may determine the current of the current backlight source, and then use the current of the backlight source to determine the corresponding backlight brightness, that is, the current backlight brightness. Then, the terminal can determine whether the current backlight brightness is greater than a preset value. If the current backlight brightness is greater than the preset value, the pre-stored corresponding relationship between the interface of the application and the brightness adjustment parameter can be obtained. In the corresponding relationship, the brightness adjustment parameter corresponding to the interface of the application is recorded. It may be a case where some interfaces of an application correspond to a brightness adjustment parameter, or different interfaces of an application correspond to different brightness adjustment parameters. The terminal may find the brightness adjustment parameter corresponding to the target interface from the corresponding relationship.

Optionally, the brightness adjustment parameter corresponding to the target interface may be determined based on the ambient light brightness, and the corresponding processing may be as follows.

A current ambient light brightness is acquired when displaying the target interface is detected; and a brightness adjustment parameter corresponding to the target interface is determined according to the current ambient light brightness, and a pre-stored corresponding relationship among the interface of the application, an ambient light brightness range and the brightness adjustment parameter.

The corresponding relationship among the interface of the application, the ambient light brightness range and the brightness adjustment parameter may be preset by a technician or may be obtained from a server (the acquisition process is described in detail hereinafter).

In the implementation, when displaying the target interface is detected, the terminal may use the light sensor to detect the ambient light brightness, and then obtain a pre-stored corresponding relationship among the interface of the application, the ambient light brightness range and the brightness adjustment parameter. Then the ambient light brightness range to which the ambient light brightness belongs is determined from the corresponding relationship. Then the target interface and the ambient light brightness range to which the ambient light brightness belongs are used, to find the brightness adjustment parameter corresponding to the target interface from the corresponding relationship.

Optionally, the brightness adjustment parameter corresponding to the target interface may be determined based on the current backlight brightness, and the corresponding processing may be as follows.

A current backlight brightness is acquired when displaying the target interface is detected; and a brightness adjustment parameter corresponding to the target interface is determined according to the current backlight brightness, and a pre-stored corresponding relationship among the interface of the application, a backlight brightness range and the brightness adjustment parameter.

The corresponding relationship among the interface of the application, the backlight brightness range and the brightness adjustment parameter may be preset by a technician or may be obtained from a server (the acquisition process is described in detail hereinafter).

In the implementation, when displaying the target interface is detected, the terminal may determine the current of the current backlight source, and then use the current of the backlight source to determine the corresponding backlight brightness, that is, the current backlight brightness. Then, a pre-stored corresponding relationship among the interface of the application, the backlight brightness range and the brightness adjustment parameter are obtained, and then the backlight brightness range to which the current backlight brightness belongs is determined from the corresponding relationship. Then the target interface and the backlight brightness range to which the current backlight brightness belongs are used, to find the brightness adjustment parameter corresponding to the target interface from the corresponding relationship.

In step 102, a current backlight brightness is reduced based on the brightness adjustment parameter corresponding to the target interface.

In the implementation, after the terminal determines the brightness adjustment parameter corresponding to the target interface, the terminal may determine the current of the current backlight source (i.e., the backlight), and then use the current of the backlight source to determine the corresponding backlight brightness, that is, the current backlight brightness. Then, the brightness adjustment parameter corresponding to the target interface is used to reduce the current backlight brightness, and after the reduction, the current of the corresponding backlight source is reduced, thereby reducing the power consumption of the terminal.

Optionally, the brightness adjustment parameter is an brightness value, and the corresponding step 102 may be processed as follows.

An brightness value corresponding to the target interface is subtracted from the current backlight brightness to obtain a reduced backlight brightness.

The brightness adjustment parameter may be brightness value, such as 10 lux.

In the implementation, after the terminal determines the brightness value corresponding to the target interface, the current of the current backlight source may be determined, and then the current of the backlight source is used to determine the corresponding backlight brightness, that is, the current backlight brightness. An brightness value is subtracted from the current backlight brightness, to obtain a reduced backlight brightness. Then, the backlight brightness is used to determine the corresponding current, and the current is applied to the backlight source. Thus, the backlight brightness becomes the reduced backlight brightness, that is, the backlight brightness can be reduced. For example, the current backlight brightness is 100 lux, the brightness value is 10 lux, and the reduced backlight brightness is 90 lux.

Optionally, the brightness adjustment parameter is an adjustment ratio, and the corresponding step 102 may include: multiplying the current backlight brightness by an adjustment ratio corresponding to the target interface, to obtain a reduced backlight brightness; or calculating a product of the current backlight brightness and an adjustment ratio corresponding to the target interface, and subtracting the product from the current backlight brightness, to obtain a reduced backlight brightness.

The brightness adjustment parameter may be an adjustment ratio, such as 10%, 15%, 20%, etc.

In the implementation, after the terminal determines the adjustment ratio corresponding to the target interface, the current of the current backlight source may be determined, and then the current of the backlight source is used to determine the corresponding backlight brightness, that is, the current backlight brightness. The current backlight brightness is reduced by the adjustment ratio. That is, the product of the current backlight brightness and the adjustment ratio corresponding to the target interface is calculated, and then the calculated product is subtracted from current backlight brightness to obtain the reduced backlight brightness, or the current backlight brightness is multiplied by the adjustment ratio corresponding to the target interface to obtain the reduced backlight brightness. Then, the backlight brightness is used to determine the corresponding current, and the current is applied to the backlight source. Thus, the backlight brightness is the reduced backlight brightness, that is, the backlight brightness can be reduced. For example, the current backlight brightness is 100 lux, the adjustment ratio is 10%, and the reduced backlight brightness is 100 lux*(1-10)%, that is, 90 lux. Alternatively, the current backlight brightness is 100 lux, the adjustment ratio is 90%, and the adjusted backlight brightness is 100 lux*90%, that is, 90 lux.

Optionally, in the embodiment of the present disclosure, a process of saving a corresponding relationship between an interface of the application and a brightness adjustment parameter by a terminal, is further provided, and the corresponding process may include: sending a request for acquiring the brightness adjustment parameter to a server periodically at a preset period; receiving a brightness adjustment parameter corresponding to the interface of the application sent by the server; and updating the pre-stored corresponding relationship between the interface of the application and the brightness adjustment parameter based on the received brightness adjustment parameter corresponding to the interface of the application.

The preset period may be preset by a technician and stored in the terminal, such as one week, and the server may be a background server of the system program, or may be a cloud or the like.

Figure 2:
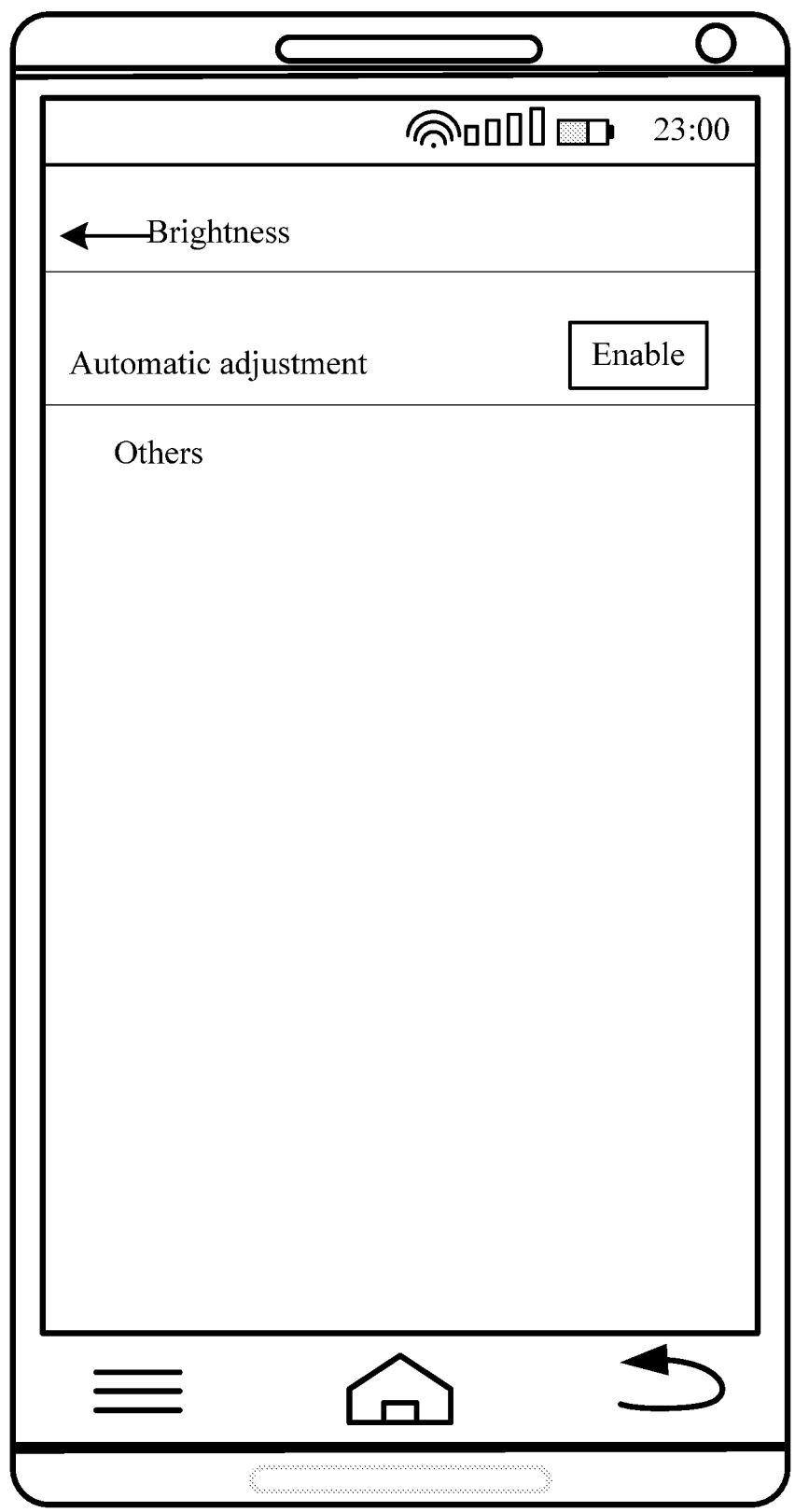
FIG. 2 is a schematic diagram of an option of automatic adjustment according to an example.
Figure 3:
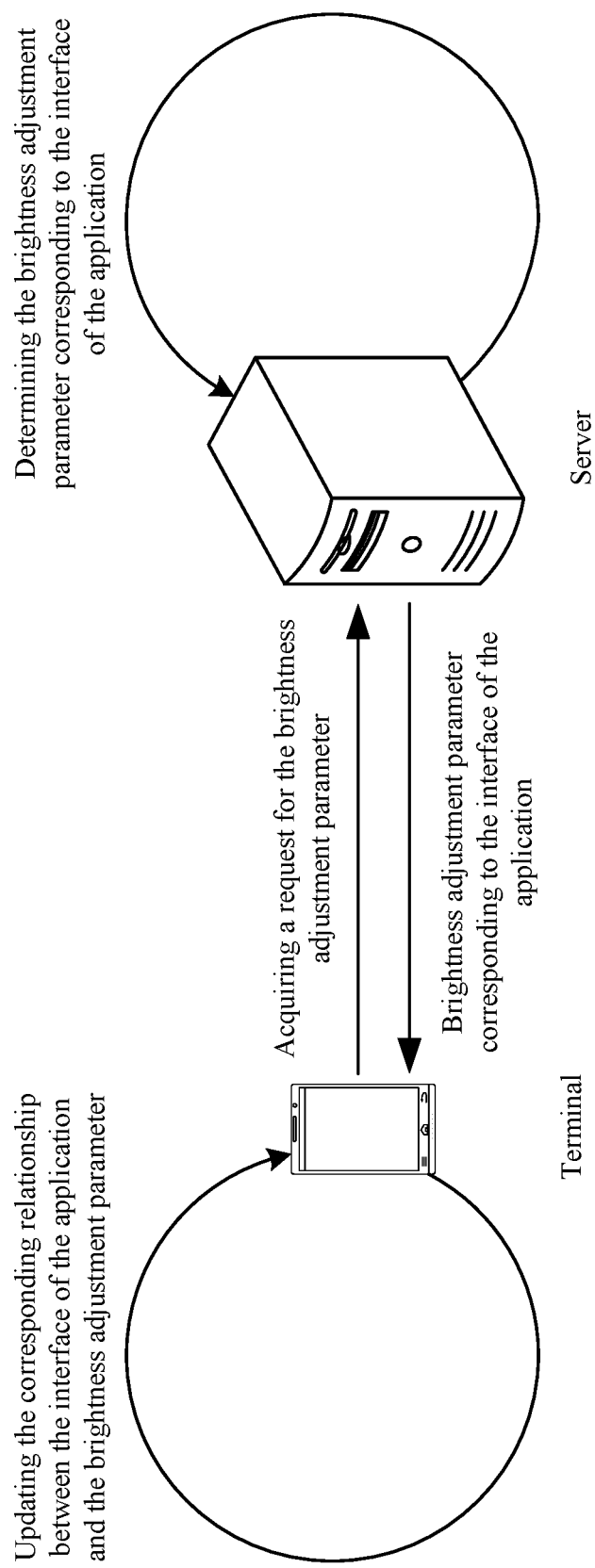
FIG. 3 is a schematic diagram of acquiring brightness adjustment parameters according to an example.

In the implementation, as shown in FIG. 2, an option of automatic adjustment is set in the setting option of the terminal, and the user can operate to enable the option of the automatic adjustment, then the terminal will determine that the function of automatically adjusting the backlight brightness is turned on, as shown in FIG. 3. Then a request for acquiring the brightness adjustment parameter is sent to a server periodically at a preset period. After receiving the request, the server obtains the currently stored brightness adjustment parameters corresponding to the interfaces of all the applications, and then sends the brightness adjustment parameters corresponding to the interfaces of the applications to the terminal. After the terminal receives the brightness adjustment parameters corresponding to the interfaces of the applications sent by the server, if, in the pre-stored corresponding relationship between an interface of an application and the brightness adjustment parameter, the brightness adjustment parameter is different from the received brightness, the terminal may update the pre-stored corresponding relationship between the interface of the application and the brightness adjustment parameter by the received brightness adjustment parameter. If, in the pre-stored corresponding relationship between an interface of an application and the brightness adjustment parameter, the brightness adjustment parameter is the same as the received brightness, no update is performed.

It should be noted that the foregoing terminal can determine identifiers of all the applications installed by the terminal, and add the identifiers of the installed applications to the acquired request. After receiving the obtaining request, the server may only obtain the brightness adjustment parameters of the interfaces corresponding to the identifiers of the applications carried in the acquired request, and send the brightness adjustment parameter corresponding to the interfaces of the applications to the terminal, so that the transmission resource can be saved.

In the embodiment of the present disclosure, a rule for setting a brightness adjustment parameter is provided.

As for an image, an existing formula of contrast ratio is $C=(L_{brightness}+R)/(L_{darkness}+R)$, wherein R is reflection brightness of the screen and is a fixed value with regard to a terminal, $L_{brightness}$ is brightness of the brightest content of the image, $L_{darkness}$ is brightness of the darkest content of the image. If the contrast of an image is relatively high, for example, $L_{brightness}$ is 200, $L_{darkness}$ is 10, and R is 10, then the contrast ratio is $C1=(200+10)/(10+10)=10.5$. If the backlight brightness is reduced by 10%, $L_{brightness}$ becomes 180, $L_{darkness}$ becomes 9, then the contrast ratio is $C2=(180+10)/(9+10)=10$. The contrast is still relatively high and the user can still see the content clearly.

If the contrast radio of an image is relatively low, for example, $L_{brightness}$ is 200, $L_{darkness}$ is 190, R is 10, then the contrast ratio is $C1=(200+10)/(190+10)=1.05$. If the backlight brightness is reduced by 10%, and $L_{brightness}$ becomes 180, $L_{darkness}$ becomes 171, then the contrast ration is $C2=(180+10)/(171+10)=1.049$. The contrast ratio becomes smaller, and the content may not be clearly seen.

Based on the above conclusions, for contents with high contrast ratios, power consumption can be reduced by reducing backlight brightness.

Therefore, when setting the corresponding relationship between the interface of the application and the brightness adjustment parameter, the brightness of the backlight for the interface with higher contrast may be lowered, and the brightness of the backlight for the content with lower contrast may not be processed or the brightness of the backlight may be lowered little. The interface with a high contrast for example is a chat window, a word document, and an email interface. The interface with a low contrast ratio for example is a product list interface in a shopping application.

Optionally, in the embodiment of the present disclosure, a process of saving a corresponding relationship among an interface of an application, an ambient light brightness range and a brightness adjustment parameter by a terminal, is further provided, and the corresponding processing may include: sending a request for acquiring the brightness adjustment parameter to a server periodically at a preset period; receiving the corresponding relationship among the interface of the application, the ambient light brightness range and the brightness adjustment parameter sent by the server, and replacing the pre-stored corresponding relationship between the interface of the application, the ambient light brightness range and the brightness adjustment parameter by using the received corresponding relationship.

In an implementation, the terminal sends a request for acquiring the brightness adjustment parameter to a server periodically at a preset period. After receiving the request, the server obtains the currently stored corresponding relationships among the interfaces of all applications, ambient light brightness ranges and the brightness adjustment parameters, and then sends the acquired corresponding relationships to the terminal. After having received the corresponding relationships sent by the server, the terminal may store the received corresponding relationships, and then deletes the pre-stored corresponding relationships among the interfaces of the applications, the ambient light brightness ranges and the brightness adjustment parameters.

Optionally, in the embodiment of the present disclosure, a process of saving a corresponding relationship among an interface of an application, a backlight brightness range and a brightness adjustment parameter by a terminal, is further provided, and the corresponding processing may include: sending a request for acquiring the brightness adjustment parameter to a server periodically at a preset period; receiving a corresponding relationship between the interface of the application, the backlight brightness range and the brightness adjustment parameter sent by the server, and replacing the pre-stored corresponding relationship between the interface of the application, the backlight brightness range and the brightness adjustment parameter by using the received corresponding relationship.

In an implementation, the terminal sends a request for acquiring the brightness adjustment parameter to a server periodically at a preset period. After receiving the request, the server obtains the currently stored corresponding relationships among the interfaces of all applications, the backlight brightness ranges and the brightness adjustment parameters, and then sends the acquired corresponding relationships to the terminal. After receiving the corresponding relationships sent by the server, the terminal may store the received corresponding relationship, and then deletes the pre-stored corresponding relationships among the interfaces of the applications, the backlight brightness ranges and the brightness adjustment parameters.

In the embodiment of the present disclosure, during the using of a target application, when displaying a target interface is detected, a brightness adjustment parameter corresponding to the target interface is determined according to a pre-stored corresponding relationship between an interface of an application and the brightness adjustment parameter; and a current backlight brightness is reduced based on the brightness adjustment parameter corresponding to the target interface. In this way, as for an application, when an interface is displayed, the brightness of the backlight may be reduced, thereby reducing the current of the backlight source and reducing power consumption of a screen, thereby providing a method for reducing power consumption of the screen of a mobile phone.

Figure 4:
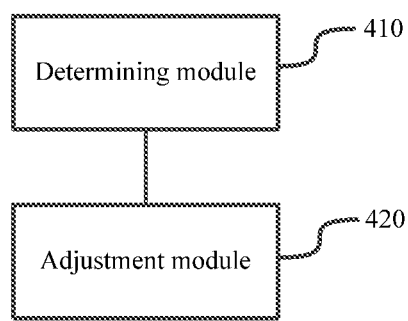
FIG. 4 is a schematic structural diagram of a device for controlling screen display according to an example.

Another example of the present disclosure further provides a device for controlling screen display, as shown in FIG. 4, the device includes:

a determining module 410, configured to, during the using of a target application, when displaying a target interface is detected, determine a brightness adjustment parameter corresponding to the target interface according to a pre-stored corresponding relationship between the interface of the application and the brightness adjustment parameter; and an adjustment module 420, configured to reduce a current backlight brightness based on the brightness adjustment parameter corresponding to the target interface.

Optionally, the determining module 410 is further configured to:

acquire a current ambient light brightness; and determine whether the current ambient light brightness is within a preset brightness range.

Optionally, the determining module 410 is configured to:

acquire a current ambient light brightness when displaying the target interface is detected; and determine a brightness adjustment parameter corresponding to the target interface according to the current ambient light brightness, and a pre-stored corresponding relationship among the interface of the application, the ambient light brightness range and the brightness adjustment parameter.

Optionally, the determining module 410 is further configured to:

acquire a current backlight brightness; and determine whether the current backlight brightness is greater than a preset value.

Optionally, the determining module 410 is configured to:

acquire a current backlight brightness when displaying the target interface is detected; and determine a brightness adjustment parameter corresponding to the target interface according to the current backlight brightness, and a pre-stored corresponding relationship among the interface of the application, the backlight brightness range and the brightness adjustment parameter.

Figure 5:
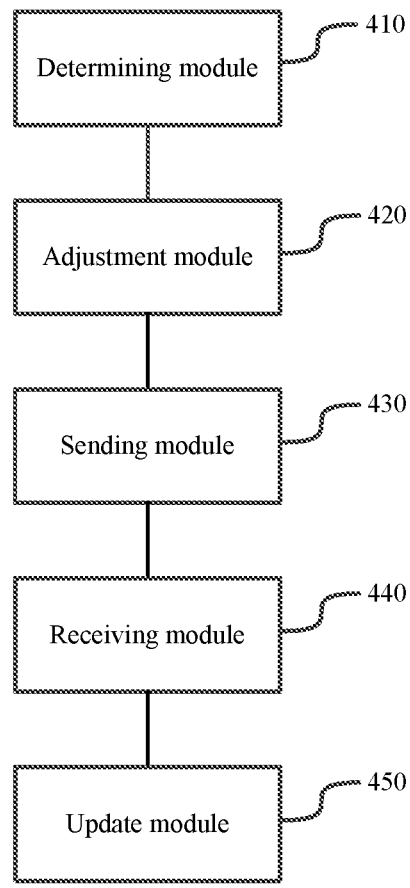
FIG. 5 is a schematic structural diagram of a device for controlling screen display according to an example.

Optionally, as shown in FIG. 5, the device further includes:

a sending module 430, configured to send a request for acquiring the brightness adjustment parameter to a server periodically at a preset period;

a receiving module 440, configured to receive a brightness adjustment parameter corresponding to the interface of the application sent by the server; and an update module 450, configured to update the pre-stored corresponding relationship between the interface of the application and the brightness adjustment parameter based on the received brightness adjustment parameter corresponding to the interface of the application.

Optionally, the brightness adjustment parameter is an brightness value; and the adjustment module 420 is configured to:

subtract the brightness value corresponding to the target interface from the current backlight brightness, to obtain a reduced backlight brightness.

Optionally, the brightness adjustment parameter is an adjustment ratio;

the adjustment module 420 is configured to:

multiply the current backlight brightness by an adjustment ratio corresponding to the target interface, to obtain a reduced backlight brightness; or calculate a product of the current backlight brightness and an adjustment ratio corresponding to the target interface, and subtract the product from the current backlight brightness, to obtain a reduced backlight brightness.

In the embodiment of the present disclosure, during the use of a target application, when displaying a target interface is detected, a brightness adjustment parameter corresponding to the target interface is determined according to a pre-stored corresponding relationship between the interface of the application and the brightness adjustment parameter; and a current backlight brightness is reduced based on the brightness adjustment parameter corresponding to the target interface. In this way, as for an application, when an interface is displayed, the brightness of the backlight may be reduced, thereby reducing the current of the backlight source and reducing power consumption of a screen, thereby providing a method for reducing power consumption of the screen of a mobile phone.

It should be noted that the device for controlling screen display provided by the above embodiment is only illustrated by the division of the above functional modules when performing screen display control. In actual applications, the functions may be realized by assigning to different function modules as needed. That is, the internal structure of the device of the screen display control may be divided into different functional modules, to complete all of or a part of the functions described above. In addition, the device of the screen display control provided by the above embodiment belongs to the same conception as the method embodiment of the screen display control, and the specific implementation process has been described in detail in the method embodiments, so details are not repeated again.

Figure 6:
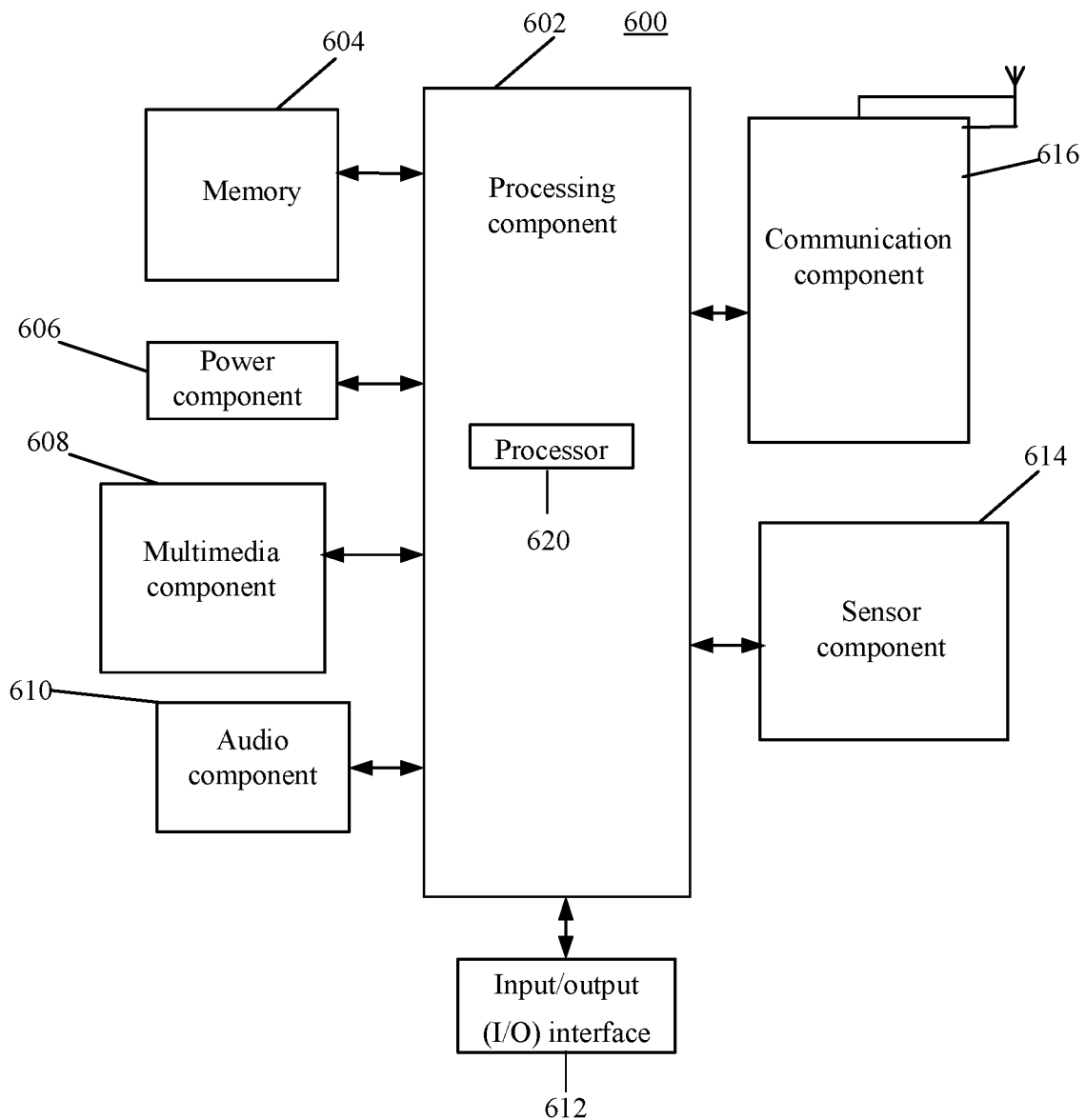
FIG. 6 is a schematic structural diagram of a terminal according to an example.

Yet another example of the present disclosure provides a structure of a terminal. The terminal can be a mobile phone or the like Referring to FIG. 6, the terminal 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the terminal 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operations of the terminal 600. Examples of such data includes instructions for any applications or methods operated on the terminal 600, contact data, phonebook data, messages, pictures, video, etc. The memory 604 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the terminal 600. The power component 606 may include a power management system, one or more power sources, and any other components associated with the generation, management, and distribution of power in the terminal 600.

The multimedia component 608 includes a screen providing an output interface between the terminal 600 and the user. In embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In embodiments, the multimedia component 608 includes a front camera and/or a rear camera. The front camera and the rear camera may receive an external multimedia datum while the terminal 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the terminal 600 is in an operation mode, such as a call mode, a recording mode, and a voice recognition mode. The received audio signal may be further stored in the memory 604 or sent via the communication component 616.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide state assessments of various aspects of the terminal 600. For instance, the sensor component 614 may detect an open/closed state of the terminal 600, relative positioning of components, e.g., the display and the keypad, of the terminal 600, a change in position of the terminal 600 or a component of the terminal 600, a presence or absence of user contact with the terminal 600, an orientation or an acceleration/deceleration of the terminal 600, and a change in temperature of the terminal 600. The sensor component 614 may include a proximity sensor configured to detect the presence of nearby objects without any physical contact. The sensor component 614 may further include a light sensor, such as a CMOS or CCD image sensor, for use in imaging applications. In embodiments, the sensor component 614 may further include an accelerometer sensor, a gyroscope sensor, a magnetic sensor, a pressure sensor or a temperature sensor.

The communication component 616 is configured to facilitate communication, wired or wirelessly, between the terminal 600 and other devices. The terminal 600 may access a wireless network based on a communication standard, such as WiFi, 2G, or 3G, or a combination thereof. In one example, the communication component 616 receives a broadcast signal or broadcast associated information from an external broadcast management system via a broadcast channel. In one example, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the terminal 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In examples, there is further provided a non-transitory computer-readable storage medium including instructions, such as included in the memory 604, executable by the processor 620 in the terminal 600, for performing the above-described methods. For example, the non-transitory computer-readable storage medium may be a ROM, a RAM, a CD-ROM, a magnetic tape, a floppy disc, an optical data storage device, and the like.

A non-transitory computer readable storage medium, when instructions in the storage medium are executed by a processor of a terminal, the terminal is enabled to perform the above method, wherein the method includes:

during the using of a target application, when displaying a target interface is detected, determining a brightness adjustment parameter corresponding to the target interface according to a pre-stored corresponding relationship between the interface of the application and the brightness adjustment parameter; and reducing the current backlight brightness based on the brightness adjustment parameter corresponding to the target interface.

Optionally, before the step of determining a brightness adjustment parameter corresponding to the target interface according to a pre-stored corresponding relationship between the interface of the application and the brightness adjustment parameter, the method further includes:

acquiring a current ambient light brightness; and determining whether the current ambient light brightness is within a preset brightness range.

Optionally, the step of when displaying a target interface is detected, determining a brightness adjustment parameter corresponding to the target interface according to a pre-stored corresponding relationship between an interface of an application and the brightness adjustment parameter includes:

acquiring a current ambient light brightness when displaying the target interface is detected; and determining the brightness adjustment parameter corresponding to the target interface according to the current ambient light brightness, and a pre-stored corresponding relationship among the interface of the application, an ambient light brightness range and the brightness adjustment parameter.

Optionally, before the step of determining a brightness adjustment parameter corresponding to the target interface according to a pre-stored corresponding relationship between the interface of the application and the brightness adjustment parameter, the method further includes:

acquiring a current backlight brightness; and determining whether the current backlight brightness is greater than a preset value.

Optionally, the step of when displaying a target interface is detected, determining a brightness adjustment parameter corresponding to the target interface according to a pre-stored corresponding relationship between the interface of the application and the brightness adjustment parameter includes:

acquiring the current backlight brightness when displaying the target interface is detected; and determining a brightness adjustment parameter corresponding to the target interface according to the current backlight brightness, and a pre-stored corresponding relationship among the interface of the application, a backlight brightness range and the brightness adjustment parameter.

Optionally, the method further includes:

sending a request for acquiring the brightness adjustment parameter to a server periodically at a preset period;

receiving a brightness adjustment parameter corresponding to the interface of the application sent by the server; and updating the pre-stored corresponding relationship between the interface of the application and the brightness adjustment parameter based on the received brightness adjustment parameter corresponding to the interface of the application.

Optionally, the brightness adjustment parameter is an brightness value; and the step of reducing a current backlight brightness based on the brightness adjustment parameter corresponding to the target interface includes:

subtracting an brightness value corresponding to the target interface from the current backlight brightness, to obtain a reduced backlight brightness.

Optionally, the brightness adjustment parameter is an adjustment ratio;

the step of reducing a current backlight brightness based on the brightness adjustment parameter corresponding to the target interface includes:

multiplying the current backlight brightness by an adjustment ratio corresponding to the target interface, to obtain a reduced backlight brightness; or calculating a product of the current backlight brightness and an adjustment ratio corresponding to the target interface, and subtracting the product from the current backlight brightness, to obtain a reduced backlight brightness.

In the embodiment of the present disclosure, during the using of a target application, when displaying a target interface is detected, a brightness adjustment parameter corresponding to the target interface is determined according to a pre-stored corresponding relationship between the interface of the application and the brightness adjustment parameter; and a current backlight brightness is reduced based on the brightness adjustment parameter corresponding to the target interface. In this way, as for an application, when an interface is displayed, the brightness of the backlight may be reduced, thereby reducing the current of the backlight source and reducing power consumption of a screen, thereby providing a method for reducing power consumption of the screen of a mobile phone.

The technical solutions provided by the present disclosure may include the following beneficial effects. In the present disclosure, during the using of a target application, when displaying a target interface is detected, a brightness adjustment parameter corresponding to the target interface is determined according to a pre-stored corresponding relationship between the interface of the application and the brightness adjustment parameter; and a current backlight brightness is reduced based on the brightness adjustment parameter corresponding to the target interface. In this way, as for an application, when the interface is displayed, the brightness of the backlight may be reduced, thereby reducing the current of the backlight source and reducing power consumption of a screen, thereby providing a method for reducing power consumption of the screen of a mobile phone.

Other embodiments of the disclosure may be apparent to those skilled in the art from consideration of the specification and practice of the disclosure disclosed here. This application is intended to cover any variations, uses, or adoptions of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling screen display, comprising:

determining a brightness adjustment parameter corresponding to a target interface of a target application according to a pre-stored corresponding relationship between the target interface and the brightness adjustment parameter; and reducing a current backlight brightness based on the brightness adjustment parameter corresponding to the target interface, when contrast of the target interface exceeds a predetermined level, wherein the target interface of the target application is determined based on the contrast of the target interface and the current backlight brightness is reduced for the determined target interface of the target application.

2. The method according to claim 1, wherein before determining the brightness adjustment parameter corresponding to the target interface according to the pre-stored corresponding relationship between the target interface and the brightness adjustment parameter, the method further comprises:

acquiring a current ambient light brightness; and determining whether the current ambient light brightness is within a preset brightness range.

3. The method according to claim 1, wherein the step of determining the brightness adjustment parameter, comprises:

acquiring a current ambient light brightness; and determining the brightness adjustment parameter corresponding to the target interface according to the current ambient light brightness, and a pre-stored corresponding relationship among the target interface, an ambient light brightness range and the brightness adjustment parameter.

4. The method according to claim 1, wherein before the step of determining the brightness adjustment parameter, the method further comprises:

acquiring a current backlight brightness; and determining whether the current backlight brightness is greater than a preset value.

5. The method according to claim 1, wherein the step of determining the brightness adjustment parameter, comprises:
acquiring a current backlight brightness; and
determining the brightness adjustment parameter according to the current backlight brightness, and a pre-stored corresponding relationship among the target interface of the application, a backlight brightness range and the brightness adjustment parameter.

6. The method according to claim 1, further comprising:
sending a request for acquiring the brightness adjustment parameter to a server periodically at a preset period;
receiving the brightness adjustment parameter corresponding to the target interface sent by the server; and
updating the pre-stored corresponding relationship between the target interface and the brightness adjustment parameter, based on the received brightness adjustment parameter corresponding to the target interface.

7. The method according to claim 1, wherein the brightness adjustment parameter is a brightness value; and the step of reducing the current backlight brightness comprises:
subtracting the brightness value from the current backlight brightness to obtain a reduced backlight brightness.

8. The method according to claim 1, wherein the brightness adjustment parameter is an adjustment ratio; and the step of reducing a current backlight brightness comprises:
multiplying the current backlight brightness by the adjustment to obtain a reduced backlight brightness; or
calculating a product of the current backlight brightness and the adjustment ratio, and subtracting the product from the current backlight brightness to obtain a reduced backlight brightness.

9. A device, comprising:
a processor; and
a memory for storing instructions executable by the processor, wherein the processor is configured to:
determine a brightness adjustment parameter corresponding to a target interface of a target application according to a pre-stored corresponding relationship between the target interface and the brightness adjustment parameter; and
reduce a current backlight brightness based on the brightness adjustment parameter corresponding to the target interface, when contrast of the target interface exceeds a predetermined level, wherein the target interface of the target application is determined based on the contrast of the target interface and the current backlight brightness is reduced for the determined target interface of the target application.

10. The device according to claim 9, wherein the processor is further configured to:
acquire a current ambient light brightness; and
determine whether the current ambient light brightness is within a preset brightness range.

11. The device according to claim 9, wherein the processor is further configured to:
acquire a current ambient light brightness; and
determine the brightness adjustment parameter according to the current ambient light brightness, and a pre-stored corresponding relationship among the target interface, an ambient light brightness range and the brightness adjustment parameter.

12. The device according to claim 9, wherein the processor is further configured to:
acquire a current backlight brightness; and
determine whether the current backlight brightness is greater than a preset value.

13. The device according to claim 9, wherein the processor is further configured to:
acquire a current backlight brightness; and determine the brightness adjustment parameter according to the current backlight brightness, and a pre-stored corresponding
relationship among the target interface, a backlight brightness range and the brightness adjustment parameter.

14. The device according to claim 9, wherein the processor is further configured to:
send a request for acquiring the brightness adjustment parameter to a server periodically at a preset period;
receive the brightness adjustment parameter sent by the server; and
update the pre-stored corresponding relationship between the target interface and the brightness adjustment parameter based on the received brightness adjustment parameter corresponding to the target interface.

15. The device according to claim 9, wherein the brightness adjustment parameter is a brightness value; and the processor is further configured to:
subtract the brightness value from the current backlight brightness to obtain a reduced backlight brightness.

16. The device according to claim 9, wherein the brightness adjustment parameter is an adjustment ratio; the processor is further configured to:
multiply the current backlight brightness by the adjustment ratio to obtain a reduced backlight brightness; or
calculate a product of the current backlight brightness and the adjustment ratio and subtract the product from the current backlight brightness to obtain a reduced backlight brightness.

17. A computer readable storage medium having stored therein instructions that, when executed by one or more processors of a terminal, causes the terminal to perform acts comprising:
determining a brightness adjustment parameter corresponding to a target interface of a target application according to a pre-stored corresponding relationship between the target interface and the brightness adjustment parameter; and
reducing a current backlight brightness based on the brightness adjustment parameter corresponding to the target interface, when contrast of the target interface exceeds a predetermined level, wherein the target interface of the target application is determined based on the contrast of the target interface and the current backlight brightness is reduced for the determined target interface of the target application.

18. The computer readable storage medium according to claim 17, further causing the terminal to perform acts comprising:
acquiring a current ambient light brightness; and
determining whether the current ambient light brightness is within a preset brightness range.

19. The computer readable storage medium according to claim 17, further causing the terminal to perform acts comprising:
acquiring a current ambient light brightness; and
determining the brightness adjustment parameter corresponding to the target interface according to the current ambient light brightness, and a pre-stored corresponding relationship among the target interface, an ambient light brightness range and the brightness adjustment parameter.

20. The computer readable storage medium according to claim 17, further causing the terminal to perform acts comprising:
acquiring a current backlight brightness; and
determining whether the current backlight brightness is greater than a preset value.

* * * * *